United States Patent [19]

Specht

[11] Patent Number: 5,519,997

[45] Date of Patent: May 28, 1996

[54] DEVICE FOR TIGHTENING A SAFETY BELT OF A MOTOR VEHICLE

[75] Inventor: Martin Specht, Feldefing, Germany

[73] Assignee: HS Technik und Design Technische Entwicklungen GmbH, Oberpfaffenhofen, Germany

[21] Appl. No.: 310,445

[22] Filed: Sep. 22, 1994

[30] Foreign Application Priority Data

Sep. 22, 1993 [DE] Germany .................. 43 52 206.9

[51] Int. Cl.$^6$ ................................................. F01B 29/08
[52] U.S. Cl. ........................... 60/632; 60/635; 60/256; 280/806; 297/480; 242/374
[58] Field of Search ............................. 60/632, 635, 256; 280/806; 297/480; 242/374

[56] References Cited

U.S. PATENT DOCUMENTS

| 3,024,592 | 3/1962 | Leaman . | |
|---|---|---|---|
| 4,008,780 | 2/1977 | Bendler et al. | 280/806 |
| 4,023,427 | 5/1977 | Beier . | |
| 4,054,032 | 10/1977 | Patrichi | 60/632 |
| 4,288,098 | 9/1981 | Tsuge et al. | 280/806 |
| 4,860,698 | 8/1989 | Patrichi et al. | 60/635 |

FOREIGN PATENT DOCUMENTS

| 0567113A1 | 10/1993 | European Pat. Off. | B60R 21/26 |
|---|---|---|---|
| 8816557.4 | of 0000 | Germany . | |
| 2249786 | 4/1974 | Germany | A62B 35/00 |
| 2459610 | 7/1975 | Germany . | |
| 2540952 | 4/1977 | Germany . | |
| 3024495 | 1/1981 | Germany . | |
| 3924512 | 2/1990 | Germany . | |
| 4228696A6 | 3/1994 | Germany | C06D 5/00 |

*Primary Examiner*—Denise L. Gromada
*Assistant Examiner*—Alfred Basichas
*Attorney, Agent, or Firm*—Keck, Mahin & Cate

[57] ABSTRACT

A drive mechanism has a guide pipe, a piston which is guided in the guide pipe and is driven by a propellant that is generated by a gas generator, and a traction mechanism which connects the piston to the component to be driven.

20 Claims, 2 Drawing Sheets

DEVICE FOR TIGHTENING A SAFETY BELT OF A MOTOR VEHICLE

FIELD OF THE INVENTION

The invention pertains to a device for tightening a safety belt of a motor vehicle.

BACKGROUND OF THE INVENTION

In a device of this type which is disclosed in German Patent (OLS) No. 2,249,786, a gas generator is disposed in a piston and the piston is driven by means of a propellant generated by the gas generator. The piston is guided in a guide pipe and can be connected with a safety belt of a motor vehicle via a traction mechanism. A pressure chamber, from which the propellant generated in the interior of the piston is discharged via at least one outlet opening, is disposed in the guide pipe.

SUMMARY OF THE INVENTION

The invention is based on the objective of creating a device for tightening a safety belt of a motor vehicle, which device has a more compact construction and which requires a smaller number of components for assembly.

A guide pipe forms a pressure chamber on the end of a piston at which propellant is discharged. In addition, a combustion chamber is formed in the interior of the piston in which the final propellant that provides the driving pressure is formed due to the combustion of the propellant being discharged from the gas generator during the ignition. On the side which is directed towards the interior of the piston and/or the combustion chamber, the gas generator can be equipped for this purpose with a bursting base as is, for example, described in German Patent Application No. P 4228696.4 or European Patent Application No. 93/106542.9.

In addition, the gas generator can be constructed in such a way that the gas is discharged from the gas generator in at least two stages, whereby the gas discharged during the first stage applies a driving pressure onto the piston which is lower as compared to the gas discharged during the ensuing second stage and/or the ensuing stages. A pyrotechnic gas generator of this type is disclosed in German Patent Application No. P 4228696.4. This measure facilitates a controlled adaptation of the pressure profile as well as a reduced stress on the components to be moved. Initially, a pushing force is applied onto the resting mass of the components to be moved during the first driving stage. In the ensuing stage and/or stages, the final pressure is built up due to the increased explosion speed. This results in a reduced stress on the part of the safety belt to be moved during the acceleration process.

The drive mechanism can be used in any instance in which components are moved from an initial position into a final position under a carefully applied traction within a short period of time, e.g., within fractions of a second. This device can, for example, be used for moving safety shutters or components in a motor vehicle from a normal position into a retracted position. It is, for example, possible to retract a steering wheel, foot pedals or a safety belt.

An additional reduction of the individual parts to be assembled as well as a reduction in the space requirement is achieved by arranging a return lock on the piston which can be engaged with the inner wall of the guide pipe so as to lock the movement of the piston opposite to the driving direction. This means that the guide pipe fulfills an additional function, namely the function of a deceleration pipe which cooperates with the return lock on its inner wall.

The return lock preferably is arranged on the end of the piston situated in the driving direction. The traction mechanism preferably is rigidly connected to the piston at this end of the piston, in particular via a cable pressing with widened cross section. This measure allows forces acting upon the traction mechanism to be transferred into the guide pipe which is fastened onto the motor vehicle with a short power flux path.

BRIEF DESCRIPTION OF THE FIGURES

The invention is described in detail below with the aid of the embodiments illustrated in the figures. The figures show.

DETAILED DESCRIPTION OF THE PREFERRED EMBODIMENTS

Figure 1:
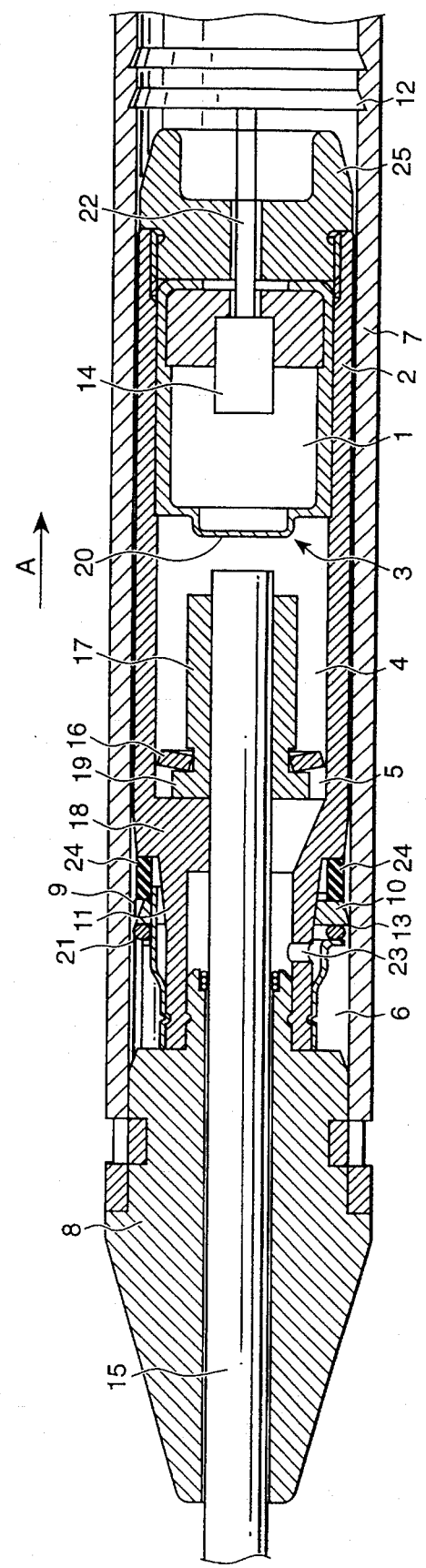
FIG. 1 is a cross-sectional view of a first embodiment of the drive mechanism.

The drive mechanisms illustrated in the Figures includes a guide pipe 7 in which is guided a piston 2 that is driven by a propellant. A gas generator 1 is arranged in the interior of the piston so as to realize the drive of the piston 2. Viewed in the driving direction (arrow A) of the piston 2, the gas generator 1 is situated at the front end of the piston 2. The gas generator can be constructed in accordance with European Patent Application No. 93/106542.9, i.e., the gas generator 1 has a bursting base 20 at its propellant outlet side 3. This base opens once the gas generator 1 ignites. Consequently, the propellant can be discharged into an interior space 4 of the piston. This interior space 4 of the piston is constructed as a combustion chamber. The combustion of the exploding propellant occurs in this combustion chamber.

It is also possible to construct the generator as a two-stage generator as described in German Patent Application No. P 4228696.4, i.e., the gas generator is equipped with explosives of different explosion speeds, whereby the gas of the first stage can be formed primarily by one or more explosives of the ignition device. The ignition preferably is carried out with the aid of an electric ignition device 14 that has a power supply 22. It is also possible to provide a mechanical ignition device.

The interior space 4 of the piston serving as the combustion chamber simultaneously serves for accommodating a cable pressing 17 which has a wider diameter than the diameter of the traction cable that serves as the traction mechanism 15. The cable pressing 17 in addition comprises a support ring 19 which firmly adjoins the inner side of the piston base 18, namely also in the starting position (FIG. 1). One or more recesses 5 through which the propellant formed in the interior space 4 of the piston can be discharged is (are) situated in the cable pressing 17, in particular in the support ring 19o The propellants are discharged into a pressure chamber 6. The interior space 4 of the piston, which serves for accommodating the cable pressing 17, simultaneously acts as a combustion chamber towards which the propellant outlet side 3 of the gas generator 1 is directed.

A return lock 9 is situated at the rear end of the piston 2 viewed in the driving direction A. The return lock 9 according to FIG. 1 is equipped with an expandable locking element 10 which consists in this embodiment of several ring segments, e.g., three ring segments. However, it is also possible to construct the locking element as a snap ring. This locking element 10 is guided on a conical projection 11. The conical projection 11 is formed onto the outer side of the piston base 18. The conical projection 11 is constructed in a hollow fashion. Its interior is connected to the pressure chamber 6 via leakage openings 23, whereby the outlet opening and/or outlet openings 5 are directed towards said pressure chamber. In the starting position, the conical projection 11 is braced on a closure element 8 of the guide pipe 7. This closure element can be constructed as a plastic plug and can form a filter for combustion residues. The other end of the pipe can also be equipped with such a closure element. The locking element 10 can be guided on the conical projection 11 with the aid of a peripheral spring element 21 and adjoin a peripheral rubber cushion 24.

The locking element 10 is constructed in such a way that it can be moved freely along the inner wall of the guide pipe 7 in the driving direction A. When moving the piston opposite to the driving direction A, the locking element 10 is widened by the conical projection 11 and engages with the inner wall of the guide pipe such that it locks the movement of the piston. For this, the locking ring preferably is provided with a pointed tip 13. Additional peripheral grooves 12 can be formed in the inner wall of the guide pipe so as to supplement the engagement between the locking element 10 with the guide pipe 7 to lock the movement of the piston. The cross section of these peripheral grooves 12 is constructed in such a way that the pointed tip 13 can engage with the locking element in a positive as well as non-positive fashion. Viewed in the moving direction A, the locking element has a slanted peripheral surface which originates at the peripheral tip 13. This measure facilitates the free movability of the locking element in the moving direction A in the illustrated embodiment.

The traction mechanism 15 which is constructed as a traction cable extends toward the component to be moved through the closure element 8. A narrowing 26 (FIG. 2).is provided in the guide pipe 7 at the end of the pipe in order to limit the movement of the piston 2. The piston 2 moves into this narrowing 26 with its front part 25 that is constructed in a conical fashion, whereby the piston subsequently is decelerated and stopped. As explained previously, the tightened condition is maintained by means of the return lock 9 that engages with the inner wall of the guide pipe 7 so as to lock the movement of the piston. The forces which act upon the traction mechanism 15 are absorbed by the cable pressing 17 fastened onto the piston 2 and transferred into the pipe 7 over a short path via the piston base and the return lock 9. The pipe 7 is mounted to be stationary, e.g., on the body of a motor vehicle.

Once the piston 2 is decelerated, the cable pressing 17 with the traction mechanism 15 connected thereon continues its movement in the driving direction A of the piston due to its inert mass. In the embodiment shown, a brake 16 in the form of a disk spring is arranged between the cable pressing 17 which produces the connection between the piston 7 and the traction mechanism 15. The cable pressing 17 is decelerated by brake 16 during its continued movement in the driving direction A. This measure facilitates a double-stage deceleration at the end of the driving movement.

Figure 2:
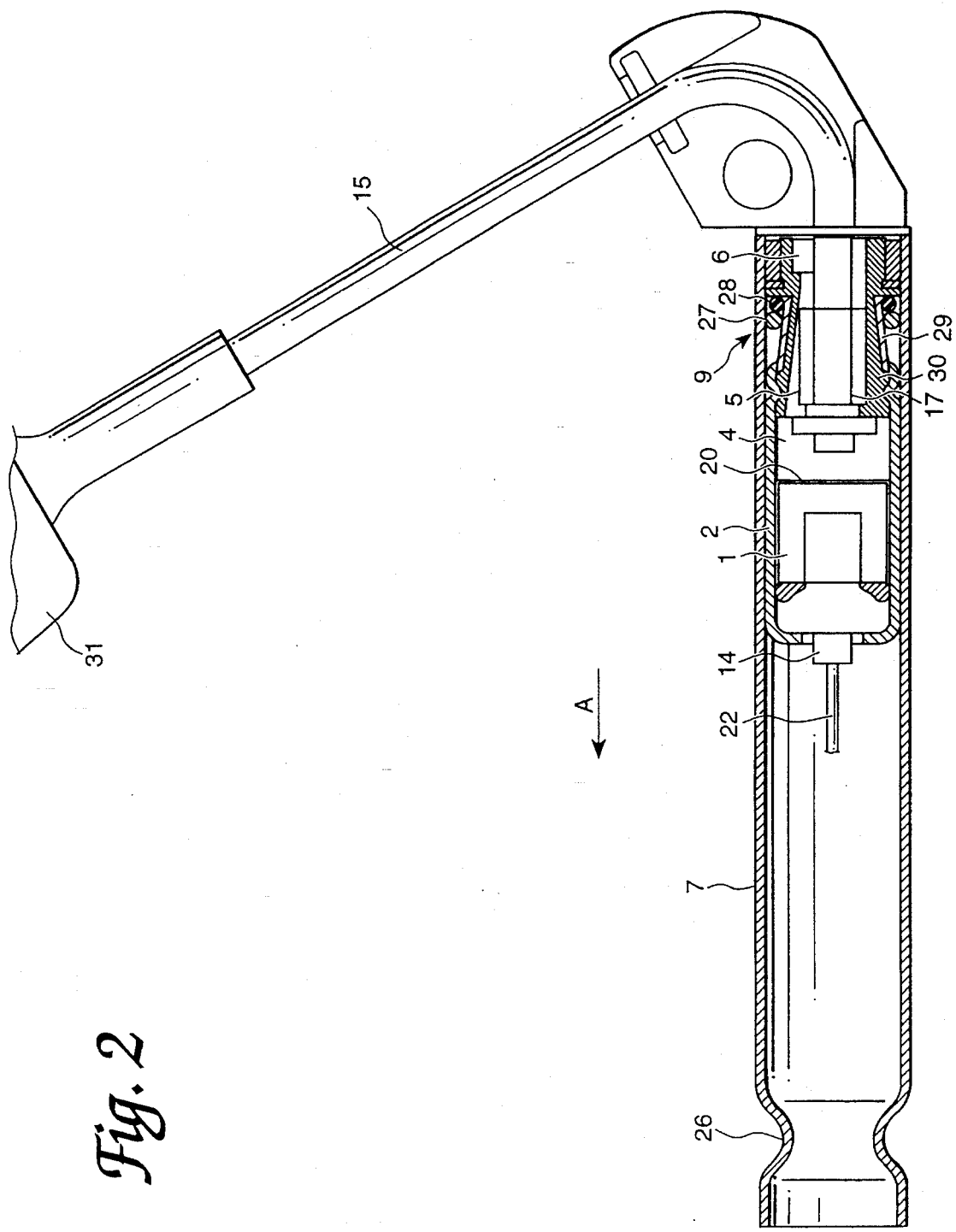
FIG. 2 is a view partly in cross-section of a second embodiment of the drive mechanism.

In the embodiment shown in FIG. 2, the return lock 9 which also can act as a return brake consists of roller bodies 27 which adjoin a ring 28 of elastic material in their starting position. The roller bodies 27 are retained in a tapered, annular space which encompasses the piston. The inner side of this space has a slanted surface. This slanted surface is formed by hard shells 29 which encompass a piston part 30 that consists of a soft material, e.g., an aluminum alloy. The other annular limitation is formed by the inner surface of the guide pipe 7.

When moving the piston in the direction of the arrow A, the roller bodies 27 remain in the position shown in FIG. 2. In order to prevent a return of the piston 2, the roller bodies 27 are displaced along the slanted surfaces of the hard shells 29 and act as clamping bodies inside of the aforementioned tapered space. It is also possible that the roller bodies are deformed on the inner wall of the pipe 7 and act as a brake.

The traction mechanism 15 which is constructed as a traction cable is connected to a seat belt lock 31 of the seat belt in a motor vehicle which is partially illustrated in the figures. The piston 2 facilitates that the seat belt lock can, for example, be retracted by a distance of 80 mm, so that the safety belt is tightened around the body of the motor vehicle passenger.

What is claimed is:

1. A drive mechanism comprises a guide pipe, a piston which is guided inside the guide pipe and can be driven by means of a propellant that is generated by a gas generator and a traction mechanism which connects the piston with a part to be driven and with a pressure chamber that is formed in the guide pipe whereby the propellant which is generated in the interior of the piston is discharged from the pressure chamber via at least one outlet opening in the piston, wherein:

the traction mechanism (15) comprises a traction cable and is rigidly connected with the piston (2) via a cable pressing (17) which has a larger diameter than the traction cable, the gas generator (1) which is arranged in the piston (2) has a propellant outlet side (3) which is directed towards an interior space (4) of the piston and opened by propellant ignited in the gas generator, the interior space (4) of the piston is constructed as a combustion chamber for the propellant which is discharged from the gas generator and is provided with at least one outlet opening (5), and the interior space (4) of the piston simultaneously serves for accommodating the cable pressing (17), said cable pressing (17) comprising a support ring which is rigidly braced on a base of the piston in the interior space of the piston.

2. A device according to claim 1, wherein the pressure chamber (6) is closed at an end of the guide pipe (7) by a closure element (8) which is constructed as a filter for combustion residues.

3. A device according to claim 1, wherein a return lock (9) is arranged on the piston and can be engaged with the inner wall of the guide pipe (7) to prevent movement of the piston in a direction opposite to the driving direction.

4. A device according to claim 3, wherein the return lock (9) is arranged at an end of the piston in the driving direction.

5. A device according to claim 3, wherein the return lock (9) is provided with a locking element (10) which can be expanded radially with respect to the axis of the guide pipe (7), the locking element being guided on a conical projection (11) of the piston (2) wherein the locking element (10) can be moved freely on the inner wall of the guide pipe (7) in the driving direction, and wherein the locking element can, if the piston moves opposite to the driving direction, be expanded by the conical projection (11) to engage with the inner wall of the guide pipe (7) and lock the movement of the piston.

6. A device according to claim 5, wherein the inner wall of the guide pipe (7) is provided with at least one peripheral groove (12), with which the locking element (10) can be engaged when expanded radially.

7. A device according to claim 5, wherein the locking element (10) has a pointed tip (13) which engages with the inner wall of the guide pipe (7) during expansion of the locking element.

8. A device according to claim 5, wherein that the locking element (10) is attached to the conical projection (11) under a prestress.

9. A device according to claim 1, wherein the gas generator (1) comprises an electric ignition device (14).

10. A device according to claim 1, wherein the traction mechanism (15) comprises a traction cable and is rigidly connected with the piston (2) via a cable pressing (17) which has a larger diameter than the traction cable.

11. A device according to claim 1, wherein the piston (2) is braced on the closure element (8) during normal operation.

12. A device according to claim 1, wherein the guide pipe (7) is braced in a stationary fashion.

13. A device according to claim 5, wherein the conical projection (11) is formed on the exterior of a base (18) of the piston.

14. A device according to claims 1, wherein the traction mechanism (15) on the piston is guided in the driving direction and decelerated at the end of the driving movement of the piston (2).

15. A device according to claim 14, wherein a brake (16) which decelerates movement of the traction mechanism (15) relative to the piston (2) in stopped position is provided between the piston (2) and the cable pressing (17).

16. A device according to claim 1, wherein the traction cable is connected to a seat belt lock (31) of a seat belt in a motor vehicle.

17. A drive mechanism comprises a guide pipe, a piston which is guided inside the guide pipe and can be driven by means of a propellant that is generated by a gas generator and a traction mechanism which connects the piston with a part to be driven and with a pressure chamber that is formed in the guide pipe, whereby the propellant which is generated in the interior of the piston is discharged from the pressure chamber via at least one outlet opening in the piston, wherein:

the gas generator (1) which is arranged in the piston (2) has a propellant outlet side (3) which is directed towards an interior space (4) of the piston and opened by propellant ignited in the gas generator, the interior space (4) of the piston is constructed as a combustion chamber for the propellant which is discharged from the gas generator and is provided with at least one outlet opening (5), a return lock (9) is provided with at least one locking element (10,27) which can be moved radially with respect to the axis of the guide pipe (7), the at least one locking element being guided on a conical projection (11) of the piston (2) wherein the at least one locking element (10,27) can be moved freely on the inner wall of the guide pipe (7) in the driving direction, and wherein the at least one locking element can, if the piston moves opposite to the driving direction, be moved by the conical projection (11) to engage with the inner wall of the guide pipe (7) and lock in the movement of the piston, and the conical projection (11) is hollow and comprises the at least one outlet opening (5).

18. A drive mechanism according to claim 17, wherein the locking element (27) comprises roller bodies (27) which are retained in an annular space which surrounds the piston.

19. A drive mechanism according to claim 18, wherein the annular space is tapered.

20. A drive mechanism comprises a guide pipe, a piston which is guided inside the guide pipe and can be driven by means of a propellant that is generated by a gas generator and a traction mechanism which connects the piston with a part to be driven and with a pressure chamber that is formed in the guide pipe, whereby the propellant which is generated in the interior of the piston is discharged from the pressure chamber via at least one outlet opening in the piston, wherein:

the gas generator (1) which is arranged in the piston (2) has a propellant outlet side (3) which is directed towards an interior space (4) of the piston and opened by propellant ignite in the gas generator, the interior space (4) of the piston is constructed as a combustion chamber for the propellant which is discharged from the gas generator and is provided with at least one outlet opening (5), the traction mechanism (15) comprises a traction cable and is rigidly connected with the piston (2) via a cable pressing (17) which has a larger diameter than the traction cable, and the at least one outlet opening (5) is formed by a recess between a support ring (19) that is arranged on the cable pressing (17) and the inner wall of the piston, whereby said support ring is rigidly braced on a base of the piston in the interior space of the piston.

\* \* \* \* \*

UNITED STATES PATENT AND TRADEMARK OFFICE
CERTIFICATE OF CORRECTION

PATENT NO. : 5,519,997
DATED : May 28, 1996
INVENTOR(S) : MARTIN SPECHT

It is certified that error appears in the above-indentified patent and that said Letters Patent is hereby corrected as shown below:

On the face of the Patent in section [30] the following should read as follows:

[30] Foreign Application Priority Data
     Sep. 22, 1993 [DE] Germany ......... 43 32 206.9

Signed and Sealed this

Eighth Day of May, 2001

Attest:

NICHOLAS P. GODICI

Attesting Officer   Acting Director of the United States Patent and Trademark Office